US012693078B2

(12) United States Patent
Ward et al.

(10) Patent No.: US 12,693,078 B2
(45) Date of Patent: Jul. 28, 2026

(54) HIGH ENTHALPY THERMOCHEMICAL ENERGY STORAGE MATERIALS

(71) Applicant: BATTELLE SAVANNAH RIVER ALLIANCE, LLC, Aiken, SC (US)

(72) Inventors: Patrick A. Ward, Aiken, SC (US); Simona H. Murph, Augusta, SC (US); Henry T. Sessions, Jr., Aiken, SC (US)

(73) Assignee: Battelle Savannah River Alliance, LLC, Aiken, SC (US)

( * ) Notice: Subject to any disclaimer, the term of this patent is extended or adjusted under 35 U.S.C. 154(b) by 632 days.

(21) Appl. No.: 17/960,520

(22) Filed: Oct. 5, 2022

(65) Prior Publication Data

US 2024/0118038 A1      Apr. 11, 2024

(51) Int. Cl.
*F28D 20/00*      (2006.01)
*C09K 5/16*      (2006.01)
*F25B 17/12*      (2006.01)

(52) U.S. Cl.
CPC .............. *F28D 20/003* (2013.01); *C09K 5/16* (2013.01); *F25B 17/12* (2013.01)

(58) Field of Classification Search
CPC ......... C09K 5/16; F28D 20/003; F24V 30/00; F25B 17/12; C01B 6/24
See application file for complete search history.

(56) References Cited

U.S. PATENT DOCUMENTS

| | | | | |
|---|---|---|---|---|
| 4,040,410 A | * | 8/1977 | Libowitz | ............... F28D 20/003 165/104.11 |
| 4,044,819 A | * | 8/1977 | Cottingham | ............ F01K 25/00 126/618 |
| 4,055,962 A | | 11/1977 | Terry | |
| 4,161,211 A | * | 7/1979 | Duffy | ........................ C09K 5/16 165/104.11 |
| 4,188,795 A | | 2/1980 | Terry | |

(Continued)

FOREIGN PATENT DOCUMENTS

| | | |
|---|---|---|
| DE | 102016110062 B3 | 5/2017 |
| JP | 2013143170 A | 7/2013 |

(Continued)

OTHER PUBLICATIONS

Ward, P.A., Corgnale, C., Teprovich, J.A et al. Technical challenges and future direction for high-efficiency metal hydride thermal energy storage systems. Appl. Phys. A 122, 462 (2016). https://doi.org/10.1007/s00339-016-9909-x (Year: 2016).*

(Continued)

*Primary Examiner* — Jianying C Atkisson
*Assistant Examiner* — For K Ling
(74) *Attorney, Agent, or Firm* — Dority & Manning, P.A.

(57) ABSTRACT

Disclosed are thermochemical energy storage materials that exhibit high enthalpy of reaction for an exothermic hydrogenation reaction at high temperature reaction conditions. Disclosed materials include titanium-aluminum-vanadium based alloys that can undergo high temperature reversible hydrogenation/dehydrogenation reactions. The materials include aluminum and vanadium in conjunction with titanium in amounts designed to encourage the high enthalpy of reaction and are substantially free of materials that would lower the enthalpy of reaction.

10 Claims, 3 Drawing Sheets

(56)          References Cited

U.S. PATENT DOCUMENTS

| | | | |
|---|---|---|---|
| 4,440,736 | A | 4/1984 | Maeland et al. |
| 4,832,913 | A | 5/1989 | Hong et al. |
| 6,000,463 | A * | 12/1999 | Astakhov .................. C09K 5/16 |
| | | | 62/480 |
| 9,777,968 | B1 * | 10/2017 | Vajo ...................... F28D 20/003 |
| 10,443,954 | B1 * | 10/2019 | Zidan .................... F28D 20/003 |
| 2001/0045247 | A1 | 11/2001 | Kubo et al. |
| 2006/0013753 | A1 | 1/2006 | Vajo et al. |
| 2007/0025908 | A1 | 2/2007 | Sandrock et al. |
| 2011/0100356 | A1 | 5/2011 | Bliesner |
| 2012/0003146 | A1 | 1/2012 | Fliermans |
| 2014/0238634 | A1 | 8/2014 | Ronnebro et al. |
| 2018/0233753 | A1 | 8/2018 | Jang et al. |
| 2020/0047248 | A1 | 2/2020 | Panza-Giosa et al. |
| 2022/0128270 | A1 | 4/2022 | Ward et al. |

FOREIGN PATENT DOCUMENTS

| | | |
|---|---|---|
| WO | WO 2014/134186 A1 | 9/2014 |
| WO | WO 2020/014055 A1 | 1/2020 |

OTHER PUBLICATIONS

Fang, Z. Z., Zhou C., Fan P., Udell K. S., Bowman, R. C., Vajo, J. J., Purewal, J. J., Kekelia, B., Metal hydrides based high energy density thermal battery, Journal of Alloys and Compounds, vol. 645, Supplement 1, 2015, pp. S184-S189. (Year: 2015).*

Blackburn, J. L., Parilla, P. A., Gennett, T., Hurst K. E., Dillon, A. C., Heben M. J., Measurement of the reversible hydrogen storage capacity of milligram Ti—6Al—4V alloy samples . . . , Journal of Alloys and Compounds, vol. 454, 2008, pp. 483-490. (Year: 2008).*

Ayub et al., "Numerical modeling and performance comparison of high-temperature metal hydride reactor equipped with bakery system for solar thermal energy storage", School of Energy and Power Engineering, Xi'an Jiaotong Universityy, China, 2020 39 pages.

Guo et al., "Hydrogen absorption kinetics of porous Ti6Al4V alloys", Journal of Alloys and Compounds, vol. 486, 2009, pp. 754-758.

Ovchinnikov et al, "Technology of new Generation Titanium Alloys Powder for Additive Technology", no date available, 8 pages.

Prasad et al., "A critical review of high-temperature reversible thermochemical energy storage systems", Applied Energy, vol. 254, 2019, 32 pages.

FY20 SRNL LDRD Full Proposal, Project Title Material Developments for 3D/4D Additive Manufacturing (AM) Technologies, 6 pages.

Related U.S. Patent Application.

U.S. Appl. No. 17/686,568, filed Mar. 4, 2022, Ragaiy Zidan, High Temperature Thermochemical Energy Storage Materials.

* cited by examiner

HIGH ENTHALPY THERMOCHEMICAL ENERGY STORAGE MATERIALS

STATEMENT REGARDING FEDERALLY SPONSORED RESEARCH OR DEVELOPMENT

This invention was made with government support under Contract No. 89303321CMN000080, awarded by the United States Department of Energy. The government has certain rights in the invention.

BACKGROUND

Efficient energy storage is necessary in order to effectively utilize renewable energy sources. Thermal energy storage (TES) systems are those that can store excess thermal energy for use at a later time and are of particular interest in solar systems. TES systems typically utilize one of three different approaches for storing thermal energy including sensible heat materials, latent heat materials, and thermochemical heat materials. Sensible heat materials store thermal energy based on heat capacity and have the lowest thermal energy density of the three classes. Sensible heat materials include molten salts, various oils, and a variety of solids, e.g., building materials. Latent heat materials have a high enthalpy associated with a phase change and have been gaining attention for TES applications. Latent heat phase change materials of interest include organics (e.g., paraffin waxes, fatty acids, glycols), salt hydrates, metals, metal alloys, and eutectics.

Thermochemical heat materials store thermal energy by use of a reversible thermochemical reaction. At high energy input, an endothermic reaction takes place, effectively storing energy in the chemical bonds formed during the reaction. The reaction products are stored separately and later can be recombined in an exothermic reaction to release the stored energy. While sensible and latent heat materials are still the most common TES materials, primarily molten salts, the achievable energy densities and heat storage periods for these materials are far less than those of thermochemical energy storage materials.

Thermochemical energy storage materials based on carbonation, oxidation, hydration, and hydrogenation reactions are among those being examined in development of improved energy storage. Among the possible thermochemical TES materials, metal hydride-based materials that utilize reversible hydrogenation/dehydrogenation reactions have the beneficial capability to store and release a large amount of heat with a high energy density, making them ideal candidates for thermochemical energy storage.

Metal hydrides show good reversibility and cycling stability combined with high enthalpies. They can be used for both short- and long-term heat storage applications and can increase the overall flexibility and efficiency of thermochemical-based energy production. Metal hydrides with working temperatures less than 500° C. have been the focus of research and development over the last few years. However, for the next generation of energy storage, metal hydride-based materials with working temperatures above 600° C. must be developed. Hydride-based materials that exhibit operation temperatures higher than those of molten salts (i.e., greater than about 565° C.) are of great interest. In addition to operation temperature, desirable materials should also exhibit hydrogen equilibrium pressures high enough to be useful in energy storage systems as well as structural stability and high surface area to provide use in a variety of applications.

What are needed in the art are thermochemical energy storage materials that are capable of reversible hydrogenation/dehydrogenation reactions with high enthalpy of reaction. Materials that can be formed with any desired geometry and high surface area would provide further benefit to the art.

SUMMARY

According to one embodiment, a thermochemical energy storage system is disclosed. The system can include a hydrogen source in fluid communication with a thermochemical energy storage material that includes a metal alloy comprising titanium in an amount of from about 50 wt. % to about 99.8 wt. %, aluminum in an amount of from about 0.1 wt. % to about 25 wt. % and vanadium in an amount of from about 0.1 wt. % to about 25 wt. %. The system can also include a heat transfer fluid in thermal communication with the thermochemical energy storage material. In one embodiment, the system can be a dual-bed hydride reactor system and the thermochemical energy storage material can be in thermal communication with a power generation system. In embodiments, the thermochemical energy storage material can be in the form of one or more porous, additively manufactured structures. In embodiments, the thermochemical energy storage material can be substantially free of materials that would lower the enthalpy of the hydrogenation reaction and/or induce reactivity to oxygen or water, such as iron, cobalt, and manganese.

A method for temporarily storing thermal energy is also disclosed. A method can include providing thermal energy to a thermochemical energy storage material that includes a titanium-aluminum-vanadium hydride. The thermal energy can drive an endothermic dehydrogenation reaction of the titanium-aluminum-vanadium hydride to produce hydrogen gas and a metal alloy. The metal alloy includes the titanium in an amount of from about 50 wt. % to about 99.8 wt. %, the aluminum in an amount of from about 0.1 wt. % to about 25 wt. %, and the vanadium in an amount of from about 0.1 wt. % to about 25 wt. %. At a later time, the method can include contacting the metal alloy with hydrogen and reaction of the hydrogen with the metal alloy according to an exothermic hydrogenation reaction to produce the thermochemical energy storage material including titanium hydride. The metal alloy can exhibit an enthalpy of reaction for the hydrogenation reaction at a temperature of about 400° C. or greater of about 100 kJ/mol or greater.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figures 1, 2:
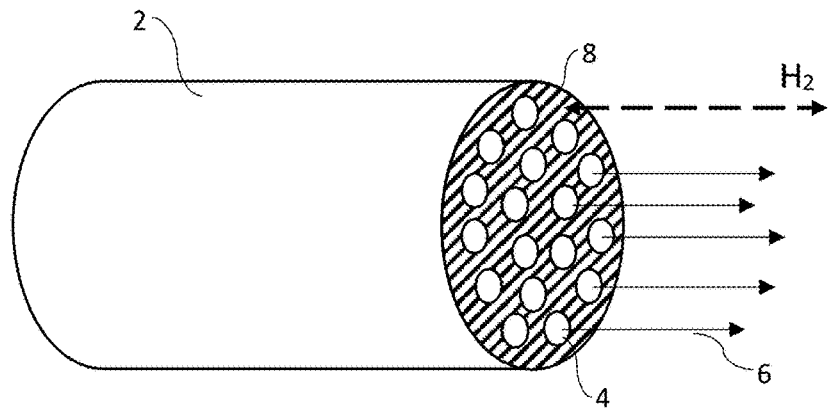
FIG. 1 schematically illustrates a simplified diagram of a heat exchanger as may incorporate a thermochemical energy storage material described herein.
FIG. 2 schematically illustrates a simplified diagram of a metal hydride-based thermal energy storage system as may incorporate a thermochemical energy storage material described herein.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, disclosed are high enthalpy TES materials that can operate at high temperature reaction conditions. More specifically, disclosed materials are titanium-aluminum-vanadium hydride-based thermochemical energy storage alloys that can undergo high-temperature (e.g., about 500° C. or higher) reversible hydrogenation/dehydrogenation reactions with very high enthalpy of reactions, e.g., about 100 kJ/mol or greater.

In addition to exhibiting high enthalpy and high temperature reaction capability, disclosed materials can maintain desirable hydrogen absorption and release characteristics across a large number of cycles. For a TES system to operate for a lifetime of about 30 years, it is estimated that the energy storage materials must be able to cycle approximately 11,000 times with low degradation over these cycles. Thus, the reversibility of an energy storage material over extended cycling is of great importance in TES applications. Disclosed energy storage materials can exhibit high stability for such long-life applications.

The energy storage materials of the disclosed TES materials can include titanium, aluminum, and vanadium. More specifically, a metal alloy of the thermochemical energy storage materials can include titanium in an amount of from about 50 wt. % to about 99.8 wt. %, such as from about 60 wt. % to about 99 wt. %, such as from about 65 wt. % to about 98 wt. %, such as from about 70 wt. % to about 96 wt. %, such as from about 80 wt. % to about 95 wt. %. An energy storage alloy can include aluminum in an amount of from about 0.1 wt. % to about 25 wt. %, such as from about 0.5 wt. % to about 20 wt. %, such as from about 1 wt. % to about 15 wt. %, such as from about 2 wt. % to about 10 wt. %. An energy storage alloy can include vanadium in an amount of from about 0.1 wt. % to about 25 wt. %, such as from about 0.5 wt. % to about 20 wt. %, such as from about 1 wt. % to about 15 wt. %, such as from about 2 wt. % to about 10 wt. %. In one embodiment, an energy storage alloy can include titanium in an amount of about 90 wt. %, aluminum in an amount of about 6 wt. %, and vanadium in an amount of about 4 wt. %.

The metal alloy can be substantially free of materials that can decrease the enthalpy of a hydrogenation reaction or that can exhibit reactivity to oxygen or water. As utilized herein, the term "substantially free of" refers to an amount of a material in the alloy of about 1 wt. % or less, such as about 0.5 wt. % or less, such as about 0.4 wt. % or less, or about 0.3 wt. % or less. Such materials can include iron, cobalt, and manganese.

The thermochemical energy storage material can include one or more additives that can be utilized to modify or provide desired characteristics to the material. For instance, additives can be utilized to modify one or more characteristics such as thermal conductivity, processing characteristics, density, etc. For instance, a material can include elemental carbon, sulfur, boron, nitrogen, or the like that can be a component of the metal alloy. In some embodiments, a material can include an additive for modulation of the thermal conductivity of the material, such as a carbon-based material including, without limitation, carbon black, carbon nanoparticles, graphite, expanded natural graphite, etc. In some embodiments, a precursor material can include a sacrificial porogen material (e.g., a polymer, a salt, or the like) that can be removed following initial formation, so as to provide porosity to the final energy storage material. When present, the thermochemical energy storage materials can generally include any additives in an amount of about 20 wt. % or less of the dehydrogenated materials, such as about 15 wt. % or less, about 10 wt. % or less, about 5 wt. % or less, or about 1 wt. % or less in some embodiments.

A metal alloy as disclosed can exhibit a favorable enthalpy of reaction with hydrogen. For instance, a hydrogenation reaction of a metal alloy as disclosed can have an enthalpy of reaction of about 100 kJ/mol or greater, such as about 110 kJ/mol or greater, about 120 kJ/mol or greater, or about 130 kJ/mol or greater. In some embodiments, a hydrogenation reaction can have an enthalpy of reaction of from about 120 kJ/mol to about 150 kJ/mol, such as from about 130 kJ/mol to about 145 kJ/mol.

Moreover, disclosed materials can exhibit high enthalpy of reaction at high reaction temperatures. For instance, the exothermic hydrogenation reaction of the metal alloy can be carried out at temperatures of about 400° C. or greater, such as about 500° C. or greater, such as about 600° C. or greater, such as about 700° C. or greater, or about 800° C. or greater in some embodiments. For instance, the exothermic hydrogenation reaction of the metal alloy can be carried out at a temperature of from about 500° C. to about 1500° C., from about 700° C. to about 1200° C., or from about 900° C. to about 1000° C. in some embodiments.

The dehydrogenation reaction can also provide hydrogen at suitable equilibrium pressure for a variety of thermochemical energy storage applications, but without being excessively high, which can prevent over-pressure of released hydrogen and allow for lower wall thickness in hydrogen containment components of a system. By way of example, the hydrogen equilibrium pressure for the thermochemical energy storage material at desired reaction temperatures (e.g., from about 500° C. to about 900° C.) can be from about 0.1 bar to about 50 bar.

The thermochemical energy storage material can be provided in any suitable form, with a preferred form generally depending upon the particular application in which the materials are to be used. For instance, the materials can be utilized as a powder or as a larger bulk solid. In one embodiment, a thermochemical energy storage material can be provided as a high surface area material, such as a porous solid or a flow-through reaction bed.

Additive manufacturing processes can be utilized to form the thermochemical energy storage materials in some embodiments. Additive manufacturing technologies are distinguished from traditional formation processes by a layer-by-layer fabrication paradigm. Additive manufacturing of disclosed materials can provide precise control over the morphology of the final form. For instance, an additive manufactured component of the formed materials can possess a structure comprising a porous network of the materials to provide a high surface area for hydrogen interaction, while also possessing high structural strength characteristics as may be beneficial for system components of a thermal energy management system. A porous network of various designs could be incorporated to provide a void space of 0.1% to 65%.

Additive manufacturing methods utilized herein include those that can deposit the energy storage materials to produce a layer followed by spontaneous or controlled curing of the deposited material, with each successive layer becoming adhered to the previous layer during the solidification process. Additive manufacturing processes encompassed herein can differ from one another with regard to the composition of the build material used to form individual layers, as well as with regard to the method utilized to deposit and/or solidify the layer/structure.

Exemplary manufacturing processes encompassed can include powder bed fusion methods such as, and without limitation to, laser sintering, electron beam melting, laser blown powder deposition systems, metal laser melting, and selective laser melting. Powder bed fusion additive manufacturing of disclosed materials can be desired in some embodiments for the ability to provide process flexibility and high geometrical accuracy (e.g., well-defined porosity).

Powder bed fusion methods as may be utilized generally include delivery of a powder including the thermochemical energy storage material to a working area where particles of the powder are spread over an area using e.g., a blade or a roller. A focused energy source, e.g., a laser or an electron beam, will melt/consolidate a section of the layer according to a predetermined pattern. A new layer is then laid over the lower layer and the process repeats until the full geometry of a part is formed. The powder thickness of each layer generally varies from about 40 µm to about 100 µm.

The thermochemical energy storage materials can be incorporated in any energy storage system for any suitable use. By way of example, FIG. 1 illustrates one example implementation of the disclosed materials as a component of a shell and tube heat exchanger 2. Of course, a heat exchanger incorporating disclosed materials can be of any design, e.g., a plate heat exchanger, a plate and shell heat exchanger, a plate fin heat exchanger, a finned tube heat exchanger, a wheel heat exchanger, etc.

A heat exchanger can include a hydrogen path that can serve to carry hydrogen to and from a thermochemical energy storage material 8, and can also include a path 6 for a heat transfer fluid. In the illustrated embodiment, the heat exchanger 2 includes a series of individual tubes 4 through which a heat transfer fluid can be moved. The tubes 4 can be formed of a material that is conducive to heat transfer between the heat transfer fluid and the thermochemical energy storage material 8, e.g., copper, nickel, steel, or the like.

The thermochemical energy storage material 8 can be located adjacent to the tubes 4 so as to encourage heat transfer across the tube walls between the material 8 and a heat transfer fluid. For instance, in some embodiments, the thermochemical energy storage material 8 can be formed directly on a surface of a heat exchanger, e.g., on the tube walls, fin surfaces, etc. Such an embodiment can be particularly attractive when considering additive manufacturing of the thermochemical energy storage materials. In some embodiments, the energy storage material 8 can be packed around the tubes 4, for instance in an embodiment in which the tubes 4 are retained within a fluid bed of the energy storage materials 8. In yet another embodiment, the energy storage material can be packed within the tubes 4 and the heat transfer fluid can flow around the multiple tubes 4 that carry the energy storage material.

A heat transfer fluid is not particular limited, and in some embodiments, different fluids can be utilized for successive cooling and heating processes. A common heat transfer fluid for this temperature range is super critical carbon dioxide, but other heat transfer fluids are likewise encompassed including, without limitation, polar, non-ionizing solvents such as water, molten salts, oils, molten metals (e.g., lead, sodium, etc.), hydrogen or helium gas, etc., or any combination thereof. Further, in certain implementations, a heat transfer fluid may include a mixture of the same or different fluids for successive heating and cooling processes.

During use, a heat transfer fluid flow 6 carrying a high temperature fluid, e.g., superheated steam, can be moved through the tubes 4, upon which heat of the fluid can encourage an endothermic dehydrogenation reaction of the thermochemical energy storage material 8, cooling the heat transfer fluid and releasing hydrogen from the energy storage material 8. Following release, hydrogen can be separated from the energy storage material 8, as indicated. The hydrogen can be released with a high enough equilibrium pressure so as to passively flow away from the energy storage material. Optionally, a secondary flow (e.g., an air flow without introduction of gas impurities) can be utilized to evacuate the released hydrogen from the energy storage material 8 and stored under compressed condition for use at a later time. At a later time, hydrogen can be returned to the energy storage material 8 under temperature and pressure conditions to encourage the exothermic hydrogenation reaction between the hydrogen and the metal alloy of the energy storage material 8. At the same time, a heat transfer fluid (e.g., supercritical carbon dioxide or helium) can be moved through the tubes 4, either in the same direction or the opposite direction as during the previous fluid cooling stage, and heat of the exothermic reaction can pass to the heat transfer fluid.

In one embodiment, a thermochemical energy storage material can be incorporated in a dual-bed hydride reactor system such as can be utilized in a concentrating solar power application, a simplified diagram of which is illustrated in FIG. 2. As illustrated, a dual-bed hydride reactor system can include a high temperature metal hydride bed 10 that includes a thermal energy storage material as disclosed and a low temperature metal hydride bed 12. The metal hydride beds can include the metal hydride materials as components of a heat exchanger such as described above and the two beds 10, 12, can be of the same or different designs. However, this is not a requirement of a system and the individual beds 10, 12 can provide the energy storage materials in any suitable arrangement.

During the day, solar energy 28 that impacts a solar concentrator 14 provides thermal energy that can be sent 16 to a power system 20; for instance, a steam generator or the like to produce electricity. A portion of the collected thermal energy can be sent 18 to the high temperature metal hydride bed 10 and used to encourage the endothermic dehydrogenation reaction of the thermochemical energy storage material, which thereby forms hydrogen gas and the metal alloy. The hydrogen that forms is allowed to flow (or encouraged to flow by use of a secondary flow) to the low temperature metal hydride bed 12, where a low temperature metal alloy to form a hydride (e.g., $NaAlH_4$, $Na_3AlH_6$, $FeTiH_x$, $MnNi_5H_x$, or the like as well as combinations of materials) according to an exothermic hydrogenation reaction. The heat generated 26 in the exothermic hydrogenation reaction of the low temperature hydride of bed 12 can be cycled to the power system 20 or used in some other fashion.

When the sun is not shining, energy 24 is provided to the low temperature metal hydride bed 12, for instance from the power system 20, to encourage the endothermic dehydrogenation reaction of the low temperature metal hydride and release hydrogen. The hydrogen from the low temperature metal hydride bed 12 then flows to the high temperature metal hydride bed 10 and drives the exothermic hydrogenation of the metal alloy of the thermochemical energy storage material in the high temperature metal hydride bed 10. This reaction generates titanium-aluminum-vanadium hydride in the energy storage material as well as heat 22, that can be used to generate energy (e.g., electricity) at the power system 20.

The favorable thermodynamics of a system that can be formed through inclusion of a thermochemical energy storage material as described can provide for a concentrated solar power plant that can operate 24 a day, with the TES system storing and releasing the needed thermal energy to maintain continuous operation of a power system. Such a system can be a self-sustaining system, with the hydrogen moving between the two beds and exploiting the temperature gradients available during charging and discharging processes.

The present disclosure may be better understood with reference to the Examples set forth below.

EXAMPLE $Ti_6Al_4V$ was examined for use as a thermochemical energy storage material. $Ti_6Al_4V$ has been widely known for some time as an orthopedic and dental implant material and exhibits excellent corrosion resistance and high strength-to-weight ratio. The $Ti_6Al_4V$ was obtained on the open market and was understood to contain from 3.5 wt. % to 4.5 wt. % vanadium, from 5.5 wt. % to 6.75 wt. % aluminum, no more than 0.3 wt. % iron, no more than 0.2 wt. % oxygen, no more than 0.08 wt. % carbon, no more than 0.05 wt. % nitrogen, no more than 0.005 wt. % yttrium, and the residual titanium.

Powders of the $Ti_6Al_4V$ were either examined as provided or were 3D printed according to a laser sintering 3D printing process to provide a porous solid construct.

Samples were approximately 50 mg and the 3D printed sample had minimal porosity. The samples were evaluated at various temperatures and the equilibrium pressure of hydrogen uptake determined at these temperatures.

Figure 3:
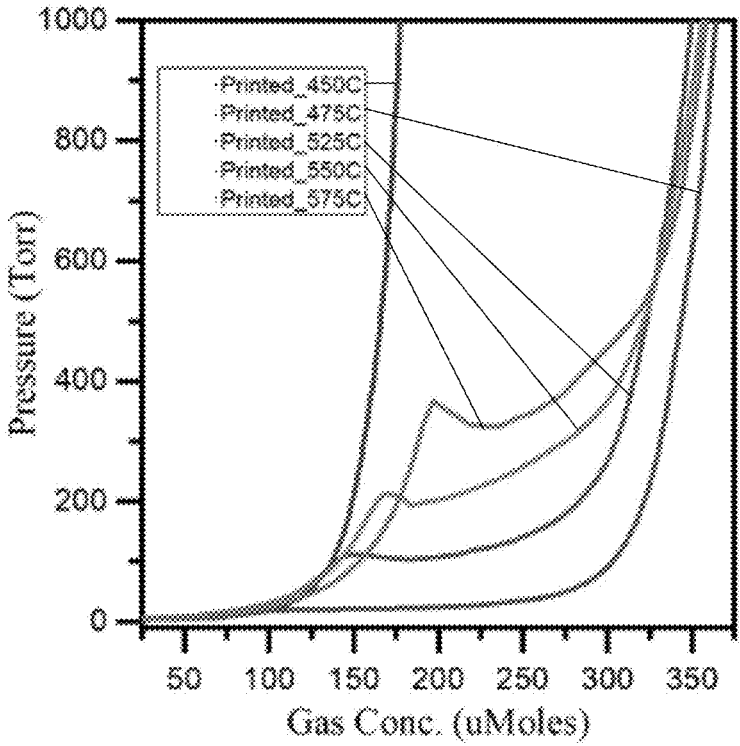
FIG. 3 presents the relationship between hydrogen equilibrium pressure and concentration at various temperature for additively manufactured thermochemical energy storage materials described herein.
Figure 4:
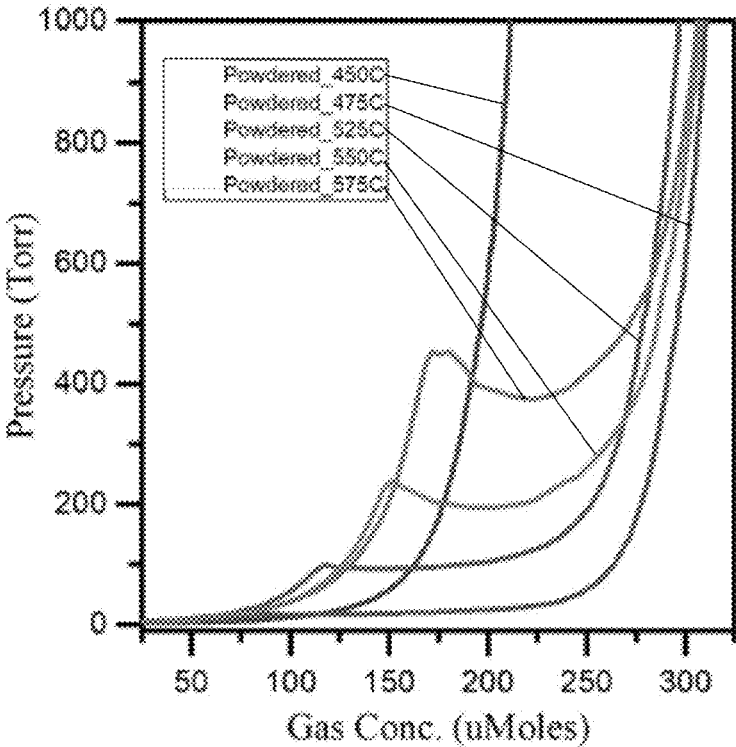
FIG. 4 presents the relationship between hydrogen equilibrium pressure and concentration at various temperature for powdered thermochemical energy storage materials described herein.

FIG. 3 and FIG. 4 show the change in pressure with hydrogen gas concentration for the 3D printed (FIG. 3) and powdered (FIG. 4) materials at several different temperatures.

Figure 5:
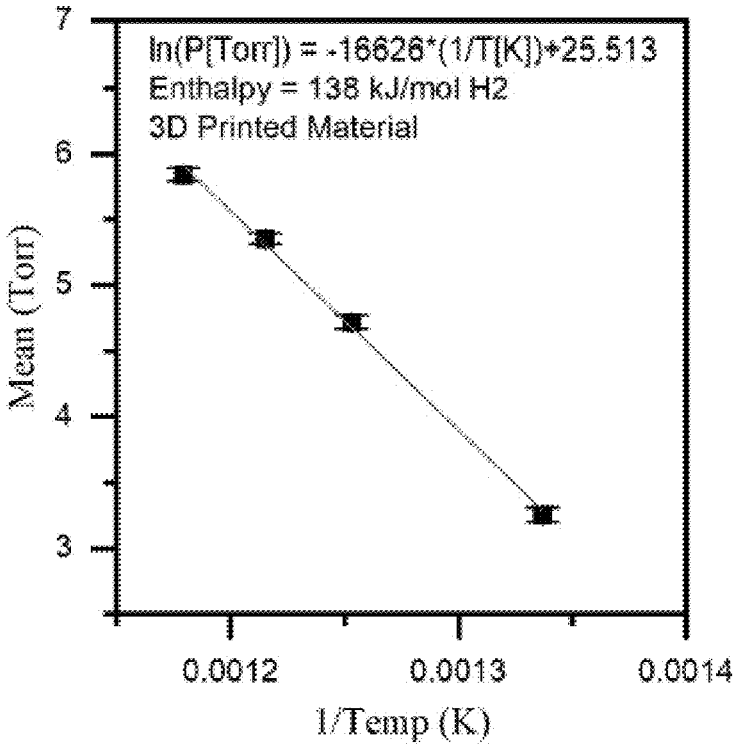
FIG. 5 presents the relationship between hydrogen equilibrium pressure and temperature for an additively manufactured thermochemical energy storage material described herein.
Figure 6:
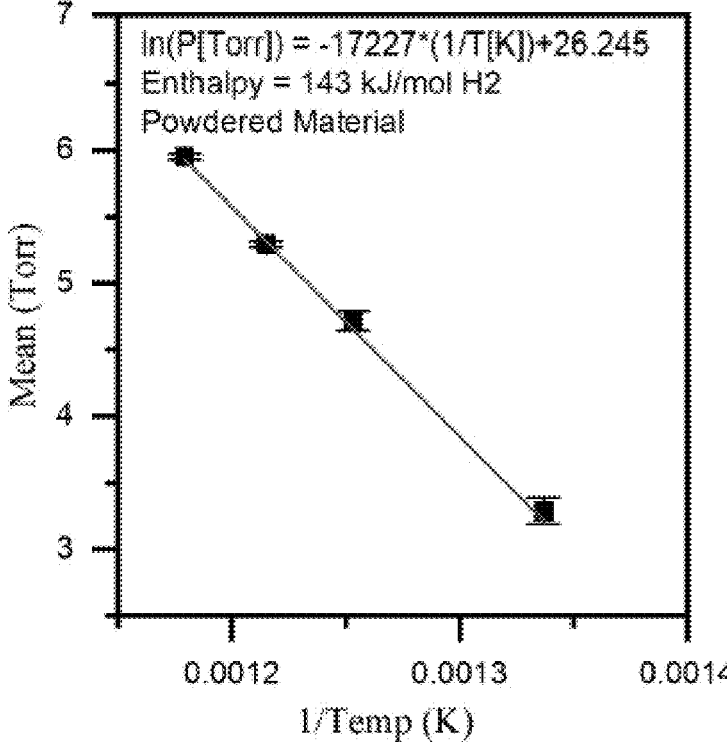
FIG. 6 presents the relationship between hydrogen equilibrium pressure and temperature for a powdered thermochemical energy storage material described herein.

FIG. 5 and FIG. 6 show the relationship between temperature and hydrogen pressure as well as the enthalpy of reaction for the hydrogenation reaction for the 3D printed (FIG. 5) and powdered (FIG. 6) materials.

The heat of reaction was determined to be 138 kJ/mol $H_2$ (printed) and 143 kJ/mol $H_2$ (powdered). The kinetics of hydrogen uptake and release in the printed materials were slower than that of the powdered material due to diffusion limitations highlighting the importance of the incorporation of porosity into the 3D printed material when fast kinetics are desired.

While certain embodiments of the disclosed subject matter have been described using specific terms, such description is for illustrative purposes only, and it is to be understood that changes and variations may be made without departing from the spirit or scope of the subject matter.

What is claimed is:

1. A thermochemical energy storage system comprising:
a hydrogen source;
a thermochemical energy storage material in fluid communication with the hydrogen source, the thermochemical energy storage material including a metal alloy comprising titanium in an amount of from about 50 wt. % to about 99.8 wt. %, aluminum in an amount of from about 0.1 wt. % to about 25 wt. %, and vanadium in an amount of from about 0.1 wt. % to about 25 wt. %, wherein the thermochemical energy storage material is substantially free of iron, cobalt, and manganese; and
a heat transfer fluid in thermal communication with the thermochemical energy storage material;
wherein the metal alloy is configured to undergo a reversible hydrogenation reaction at a temperature of about 500° C. or greater.

2. The thermochemical energy storage system of claim 1, wherein the heat transfer fluid comprises water, steam, supercritical carbon dioxide, hydrogen gas, helium gas, molten salts, molten metals, or any combination thereof.

3. The thermochemical energy storage system of claim 1, wherein the thermochemical energy storage material comprises one or more additives.

4. The thermochemical energy storage system of claim 1, wherein the thermochemical energy storage material is in the form of an additively manufactured porous structure.

5. The thermochemical energy storage system of claim 4, wherein the thermochemical energy storage material has been manufactured on a surface of the system.

6. The thermochemical energy storage system of claim 5, wherein the surface of the system is configured to transfer heat from the thermochemical energy storage material to the heat transfer fluid.

7. The thermochemical energy storage system of claim 1, wherein the thermochemical energy storage material is in the form of a fluid bed.

8. A dual-bed hydride reactor comprising the thermochemical energy storage system of claim 1, the reactor comprising a low enthalpy metal hydride bed, and a hydrogen cycling system between the low enthalpy metal hydride bed and the thermochemical energy storage system of claim 1 such that the hydrogen source comprises the low temperature metal hydride bed.

9. The dual bed hydride reactor of claim 8, wherein the heat transfer fluid is in communication with an electricity generation system.

10. The thermochemical energy storage system of claim 1, wherein the metal alloy is configured to undergo a reversible hydrogenation reaction at a temperature of about 600° C. or greater.

* * * * *